(12) United States Patent
Bumiller (10) Patent No.: US 7,145,553 B2
(45) Date of Patent: Dec. 5, 2006

(54) HANDHELD ELECTRONIC DEVICE HAVING FACILITATED INPUT AND ASSOCIATED METHOD

(75) Inventor: George B. Bumiller, Ramsey, NJ (US)

(73) Assignee: Research In Motion Limited, Ontario (CA)

( * ) Notice: Subject to any disclaimer, the term of this patent is extended or adjusted under 35 U.S.C. 154(b) by 264 days.

(21) Appl. No.: 10/785,134

(22) Filed: Feb. 24, 2004

(65) Prior Publication Data

US 2005/0188324 A1  Aug. 25, 2005

(51) Int. Cl.
*G09G 5/00* (2006.01)
(52) U.S. Cl. ..................... 345/169; 345/156
(58) Field of Classification Search ............. 345/156, 345/168, 169, 173
See application file for complete search history.

(56) References Cited

U.S. PATENT DOCUMENTS

| | | | | |
|---|---|---|---|---|
| 5,153,827 A | * | 10/1992 | Coutre et al. ............. | 604/111 |
| 5,916,310 A | | 6/1999 | McCain et al. | |
| 2003/0182171 A1 | * | 9/2003 | Vianello .................... | 705/9 |
| 2004/0181461 A1 | * | 9/2004 | Raiyani et al. ........... | 705/26 |

OTHER PUBLICATIONS

Nokia: "Nokia 7210 User's Guide", Internet Article, 2003, pp. 39-50, XP002316253.
Martin Honnen, Pon Bakyaraj, Adam Finster: "(How) Can I convert the key pressed (for instance to upper case)?", Internet Article, Apr. 5, 2003, XP002316254.
"Using your Treo"; 2003; 50-1076-00; Handspring, Inc., United States of America.

* cited by examiner

*Primary Examiner*—Ricardo Osorio
(74) *Attorney, Agent, or Firm*—Brij K. Agarwal; Robert A. Diaz; Eckert Seamans Cherin & Mellott, LLC (57) ABSTRACT

An improved handheld electronic device and an improved method facilitate the entry of data when the data is to be of a particular arrangement of alphabetic (A) and/or numeric (N) and/or other characters. In the depicted exemplary embodiment, the handheld electronic device includes a user interface that facilitates the entry of postal codes, zip codes, and the like that vary from country to country by processing key inputs according to a data format that has been selected on the basis of its correspondence with a country. In the example of address data, the handheld electronic device detects the entry of country-specific data, such as the name of the country or one of its geographic regions, and selects a corresponding data format for processing keystrokes during entry of postal codes, zip codes, or other codes.

26 Claims, 4 Drawing Sheets

```
XXXX: ______________________________
PROVINCE/STATE: ▨—64      ⌒—52
COUNTRY: ________⌒—56_____________
POSTAL / ZIP CODE: ______⌒—60______
```
*FIG.3A*

```
XXXX: ______________________________
PROVINCE/STATE: ON      ⌒—52
COUNTRY: ________⌒—56_____________
POSTAL / ZIP CODE: ▨—64    ⌒—60
```
*FIG.3B*

```
XXXX: ______________________________
PROVINCE/STATE: ON   ⌒—52
COUNTRY: ________⌒—56_____________
POSTAL / ZIP CODE: R ▨—64   ⌒—60
```
*FIG.3C*

```
XXXX: ______________________________
PROVINCE/STATE: ON   ⌒—52
COUNTRY: ________⌒—56_____________
POSTAL / ZIP CODE: R2L 3W8   ⌒—60
```
*FIG.3D*

```
XXXX: ______________________________
PROVINCE/STATE: ______⌒—52_________
COUNTRY: CA         ⌒—56
POSTAL / ZIP CODE: ▨—64    ⌒—60
```
*FIG.3E*

```
XXXX: ______________________________
PROVINCE/STATE: < PLEASE ENTER PROVINCE/STATE OR COUNTRY >  ⌒—52
COUNTRY: ________⌒—56_____________
POSTAL / ZIP CODE: ▨—64   ⌒—60
```
*FIG.3F*

HANDHELD ELECTRONIC DEVICE HAVING FACILITATED INPUT AND ASSOCIATED METHOD

BACKGROUND OF THE INVENTION

1. Field of the Invention

The invention relates generally to handheld electronic devices and, more particularly, to a handheld electronic device having facilitated data input. The invention also relates to a method for facilitating input to a handheld electronic device.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain conditions. For instance, a given key, when pressed, may input a lower case letter, and additionally may input a capital letter when combined with a <SHIFT> key, and further may input a digit or a symbol when combined with an <ALT> key. While such key configurations have been generally effective for their intended purposes, such key configurations have not, however, been without limitation.

Certain data entry applications require the input to be in the form of a specific combination of numeric and/or alphabetic characters in a given arrangement. For instance, if the data field requires a certain arrangement of digits and capital letters, a user must combine key entries with appropriate <ALT> and <SHIFT> keys, which can become cumbersome. As an example, a Canadian postal code is required to be in the form of six alternating alphabetic (A) and numeric (N) characters, with a space between the third and fourth characters, thus ANA NAN. An American zip code is required to be in a form having either five numeric characters, thus NNNNN, or must include the five numeric characters plus an additional four numeric characters separated by a hyphen from the aforementioned five numeric characters, thus NNNNN-NNNN.

SUMMARY OF THE INVENTION

An improved handheld electronic device and an improved method facilitate the entry of data when the data is to be of a particular arrangement of alphabetic (A) and/or numeric (N) and/or other characters. In the depicted exemplary embodiment, the handheld electronic device includes a user interface that facilitates the entry of postal codes, zip codes, and the like that vary from country to country by processing key inputs according to a data format that has been selected on the basis of its correspondence with a country. In the example of address data, the handheld electronic device detects the entry of country-specific data, such as the name of the country or one of its geographic regions, and selects a corresponding data format for processing keystrokes during entry of postal codes, zip codes, or other codes.

Accordingly, an aspect of the invention is to provide an improved handheld electronic device having facilitated entry of data such as, for example, and without limitation, postal codes, zip codes, and other data.

Another aspect of the invention is to provide an improved handheld electronic device and method in which country-specific data that has been entered is used to select a corresponding data format for the processing of additional entered data, such as, for example, and without limitation, postal codes, zip codes, and other data.

Another aspect of the invention is to provide an improved handheld electronic device and associated method that enable the entry of data in a specific arrangement according to a corresponding data format and that is configured in order that, in the absence of the data format the data input, could require the use of keystrokes combined with additional key inputs of <ALT> and/or <SHIFT>.

These and other aspects of the invention are provided by an improved method of enabling data entry into a handheld electronic device, the data entry including a plurality of data elements, in which the general nature of the method can be stated as including detecting a first input into the handheld electronic device, processing the detected first input to obtain a first of the data elements, responsive to the first of the data elements, selecting a corresponding data format from a plurality of data formats, detecting a second input into the handheld electronic device, and processing the detected second input according to the selected corresponding data format to obtain a second of the data elements, the second of the data elements conforming to the selected corresponding data format.

The improved method may include detecting a number of key inputs and processing each one of the detected key inputs to obtain a number of processed key outputs that conform to the selected corresponding data format. Such an improved method may also include outputting each one of the processed key outputs to correspond with a corresponding one of the detected key inputs. Such a method may further include outputting at least one of the processed key outputs that otherwise in the absence of the selected corresponding data format could be obtained from the corresponding one of the detected key inputs in combination with another detected key input.

The method may also include detecting an initiation of the second input, detecting that the first input has not yet been entered, and providing a prompt to enter the first input. Alternatively or additionally, the method may include employing as the detected first input one of a country input and a sub-country input. The method may also include determining that the detected first input is the sub-country input, comparing the detected first input with a data set that includes a plurality of country data records in a memory, and identifying one of the country data records to obtain the first of the data elements.

Another aspect of the invention is to provide an improved handheld electronic device structured to enable data entry, the data entry including a plurality of data elements, in which the general nature of the handheld electronic device can be generally stated as including a keyboard, a display, and a processor. The keyboard includes a plurality of keys. The processor includes a memory and a routine that is adapted to respond to input signals from the keys and to generate output signals to the display. The routine is adapted to detect a first input and to process the first input to obtain a first of the data elements. Responsive to the first of the data elements, the routine is adapted to generate a first of the output signals to the display and to select from the memory a corresponding data format from a plurality of data formats. The routine is adapted to detect a second input from the keys. Responsive to the detected second input, the routine is adapted to process the detected second input according to the selected corresponding data format to obtain a second of the data elements and to generate a second of the output signals to the display.

The routine may be adapted to detect a number of key inputs, to process each one of the detected key inputs to obtain a number of processed key outputs that conform to the selected corresponding data format, and to output each one of the processed key outputs to correspond with a corresponding one of the detected key inputs. The routine further may be adapted to output at least one of the processed key outputs that otherwise in the absence of the selected corresponding data format could be obtained from the corresponding one of the detected key inputs and another detected key input. Moreover, the processor may be structured in order that, otherwise in the absence of the selected corresponding data format, the corresponding one of the detected key inputs represents a character that is one of alphabetic and numeric, and the corresponding one of the detected key inputs in combination with one of a detected <ALT> key input and a detected <SHIFT> key input represents a character that is the other of alphabetic and numeric, and wherein the routine is adapted to output the at least one of the processed key outputs to represents a character that is the other of alphabetic and numeric.

BRIEF DESCRIPTION OF THE DRAWINGS

A full understanding of the invention can be gained from the following Description of the Preferred Embodiment when read in conjunction with the accompanying drawings in which.

Similar numerals refer to similar parts throughout the specification.

DESCRIPTION OF THE PREFERRED EMBODIMENT

Figure 1:
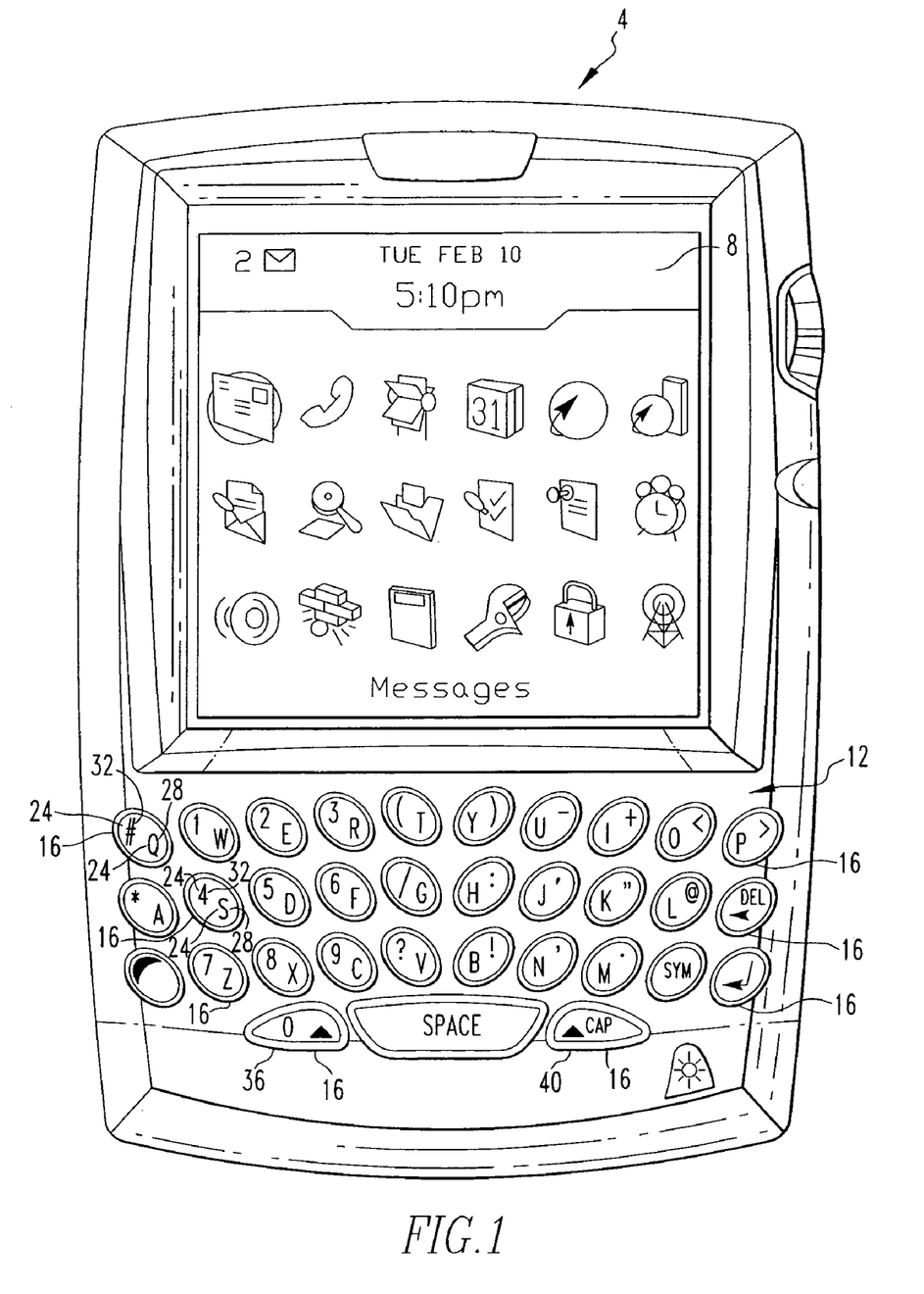
FIG. 1 is a top plan view of an improved handheld electronic device in accordance with the invention.
Figure 4:
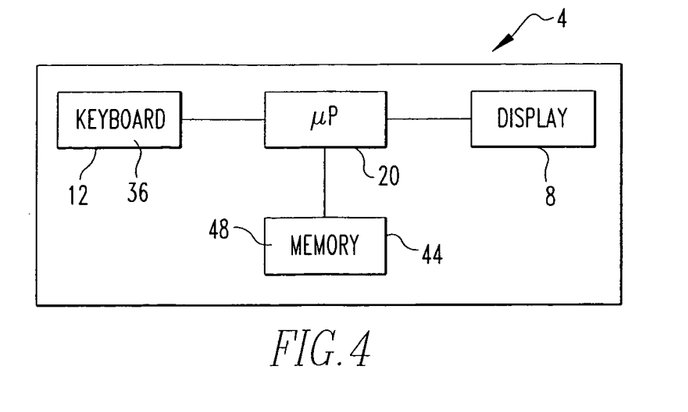
FIG. 4 is a block diagram of the handheld electronic device of FIG. 1.
Figure 5:
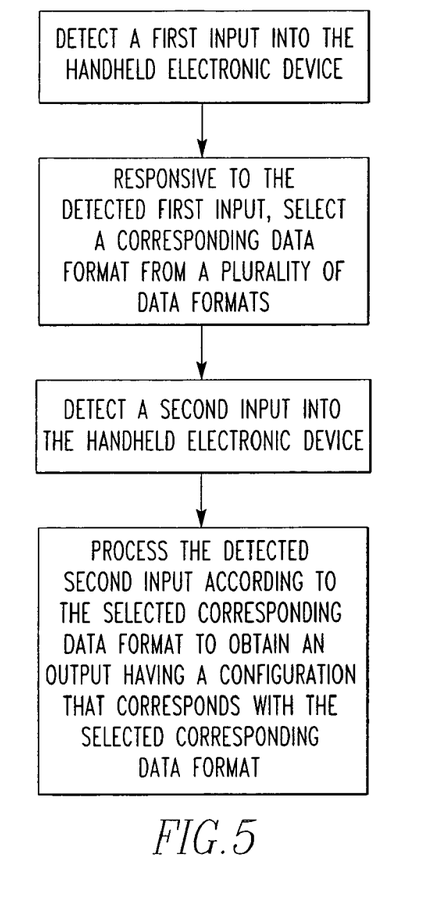
FIG. 5 is a flowchart depicting a flowchart of a routine of a processor of the handheld electronic device of FIG. 1.

An improved handheld electronic device 4 in accordance with the invention is depicted generally in FIGS. 1 and 4. The exemplary handheld electronic device 4 includes a display 8, a keyboard 12 having a plurality of keys 16, and a processor 20 which may be, without limitation, a microprocessor (μP), and is responsive to inputs from the keyboard 12 and provides output signals to the display 8. As used herein, the expression "key" and variations thereof shall refer broadly to any of a variety of input members such as buttons, switches, and the like without limitation. Examples of handheld electronic devices are included in U.S. Pat. Nos. 6,452,588 and 6,489,950, which are incorporated by reference herein.

As can be seen in FIG. 1, most of the keys 16 include a number of characters 24 thereon. As used herein, the expression "a number of" and variations thereof shall refer broadly to any non-zero quantity, including a quantity of one. The characters 24 of many of the keys include an alphabetic character 28, such as a letter, and a numeric character 32, such as a digit. The numeric characters 32 in this example would also include punctuation marks and other symbols typical of a keyboard.

The keyboard 12 in this example additionally includes an <ALT> key 36 and a <SHIFT> key 40 that may or may not additionally include one or more characters 24. The <ALT> key 36 and the <SHIFT> key 40 can be combined with the keys 16 to provide the keys 16 with multiple functions. For example, and without limitation, if one of the keys 16 is pressed, it might provide an input to the processor 20 that represents the alphabetic character 28 in lower case. If the same key 16 is combined with the <SHIFT> key 40, such as if one first presses the <SHIFT> key 40, and then presses the key 16, then the result will be the same alphabetic character 28, except in upper case, i.e., as a capital letter. If the <ALT> key 36 is combined with the same key 16, then the result is the numeric character 32.

The processor 20 also includes memory 44 that can be any of a variety of types of internal and/or external storage media such as, without limitation, RAM, ROM, EPROM(s), EEPROM(s), and the like, that provide a storage register for data storage such as in the fashion of an internal storage area of a computer, and can be volatile memory or nonvolatile memory. The memory 44 further includes a number of routines 48 for the processing of data. The routines 48 can be in any of a variety of forms such as, without limitation, software, firmware, and the like. As will be described in greater detail below, the routines 48 include a plurality of data formats that can be selectively initiated in order to process input data from the keyboard 12 and to provide specifically formatted output to the display 8 and/or the memory 44. In the exemplary depicted embodiment, the routines 48 are selectable by the processor 20 to process data input from the keyboard 12 according to a specific data format that corresponds with other previously-entered data.

Specifically, the routines 48 are selected according to entered data identifying a country, or identifying a sub-country designation, i.e., a province, a state, a geographic region, or other location within a country that identifies the country. The selected corresponding routine 48 provides a selected corresponding data format that processes additional input data to provide a processed output that conforms to the specific format of a postal code, a zip code, or other identifying code particular to the identified country. In the particular embodiment, the country data can either be the name of the country spelled out or an appropriate abbreviation of the country. The expression "sub-country" and variations thereof shall refer broadly to any of a province, a state, a geographic region, or any other particular area or location that exists within a given country and that may help to identify the location within the country and/or the country.

Exemplary depictions of portions of the display 8 during portions of an exemplary data entry operation in accordance with the improved method of the invention are provided in FIGS. 3A–3F. The exemplary FIGS. 3A–3F generally depict portions of an exemplary data entry process within an address entry and storage application. The data entry on the handheld electronic device 4 includes a plurality of data elements. While the exemplary identified use of the method of the invention is in the context of address entry and storage within the handheld electronic device 4, it is understood that the teachings presented herein could be applied to other areas of an address application and/or to other applications. The exemplary portions of the display 8 depicted in FIGS. 3A–3F include a sub-country data field 52 identified in the exemplary figures as having the heading "Province/State:" next to a blank line which represents the sub-country data field 52. The display 8 additionally includes a country data field 56 and a postal code data field 60. The country data field 56 includes the heading "Country:" next to a blank line that indicates the country data field 56, and the postal code data field 60 includes the heading "Postal/Zip Code:" next to a blank line that signifies the postal code data field 60. A cursor 64 is depicted in FIGS. 3A–3C, 3E, and 3F, and indicates the data field into which data will be entered.

Figure 3A:
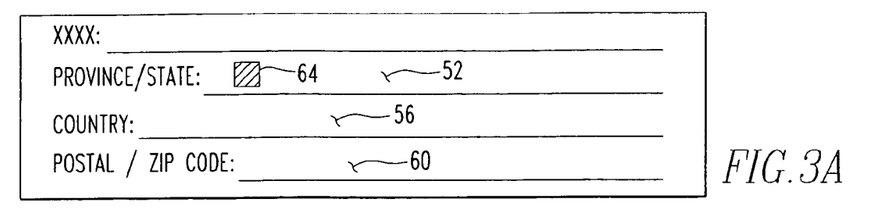
FIG. 3A is a first view of a portion of a display of the handheld electronic device of FIG. 1 during a portion of a data entry operation according to the routine of FIG. 2.

FIG. 3A depicts the sub-country data field 52, the country data field 56, and the postal code data field 60 as being empty, with the cursor 64 being located in the sub-country data field 52. It shall be understood that the expression "postal code" and variations thereof shall refer broadly to any type of designation, whether containing alphabetic (A) and/or numeric (N) characters in particular formats, regardless whether the data are otherwise referred to as "postal codes", "zip codes", "region codes", or any other such designation. FIG. 3A depicts the handheld electronic device 4 during the data entry operation in which a first input, after processing, will result in a first data element in the form of a particular sub-country designation, such as, without limitation, a province or a state. It is understood that country data could additionally or alternatively serve as a first data element.

Figure 3B:
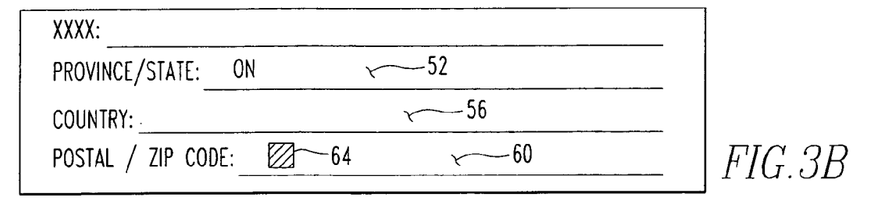
FIGS. 3B–3F are other views of portions of the display of the handheld electronic device of FIG. 1 during other portions of the data entry operation according to the routine of FIG. 2.
Figure 3C:
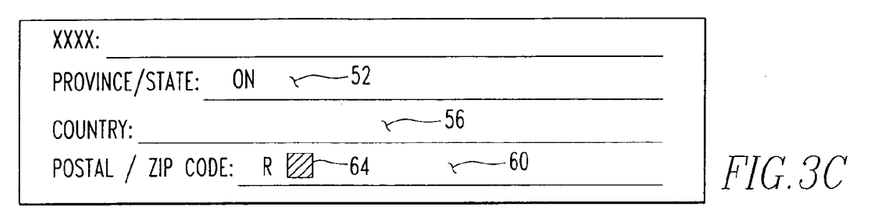

Referring to FIG. 3B, if a first input is entered at the sub-country data field 52, such as would result in the first data element being displayed as "ON" in the sub-country data field 52, and if the first data element can be used to identify a country, then the cursor 64 is moved automatically to the postal code data field 60 for entry of a postal code in the format of the identified country. In the specific example given, the first input in FIG. 3B has been entered into the sub-country data field 52 and is the resultant first data element is "ON", which is an abbreviation for Ontario, which is a Canadian province. Canadian addresses are known to include a postal code in the form of six alternating alphabetic and numeric characters, with a space dividing the third and fourth characters, thus ANA<SPACE>NAN. The identification of Ontario identifies Canada as the country of the address, and a corresponding routine 48 is selected that will process a second data input to provide a processed output in the form of a second data element that conforms to the aforementioned postal code format ANA<SPACE>NAN. In FIG. 3B, since the exemplary data input into the sub-country data field 52 was successfully looked up to identify Ontario and Canada, and a corresponding data format was successfully selected and initiated, the cursor 64 has moved to the postal code data field 60 to allow input of a postal code. FIG. 3C depicts the entry of the postal code in the postal code data field 60. The exemplary first character of the postal field is "R", which conforms to the selected corresponding data format which mandates that the first character of the postal code be alphabetic.

Figure 3D:
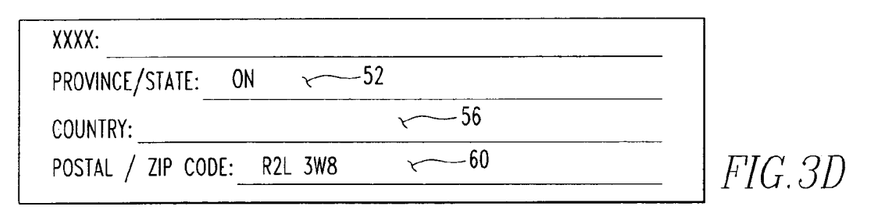

FIG. 3D depicts the postal code data field 60 as being filled, i.e., having a complete entry that conforms to the selected corresponding data format ANA<SPACE>NAN. Since the field has been completed, the cursor 64 has moved to a different field that is not depicted in FIG. 3D. It is noted that the exemplary postal code in the postal code data field 60 of FIG. 3D is "R2L 3W8", which includes a <SPACE> between the "L" and "3". The exemplary selected routine 48 automatically inserts a <SPACE> between the third and fourth characters (if the identified country is Canada), and inserts the single space after entry of the third character, whether the next input is a <SPACE> or the fourth character of the postal code.

Figure 3E:
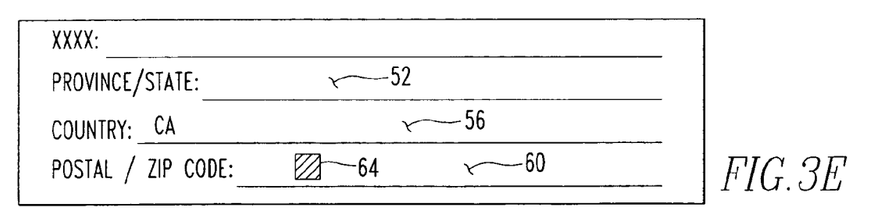

FIG. 3E depicts an alternative mode of facilitating entry of the postal code. Specifically, instead of entering data in the sub-country data field 52, the first input has resulted in the first data element "CA" being entered into the country data field 56, and such data element corresponds with the country Canada. Since the input into the country data field 56 successfully identified a country, an appropriate routine 48 has been selected (the same routine as described in relation to FIGS. 3B–3D), and the cursor 64 has moved to the postal code data field 62 in order to allow entry of the postal code. It is understood that the country data field 56 could also include other abbreviations or the full name of the country "Canada" or other such country in order to provide the necessary first input to select the corresponding data format for the postal code data field 60.

Figure 3F:
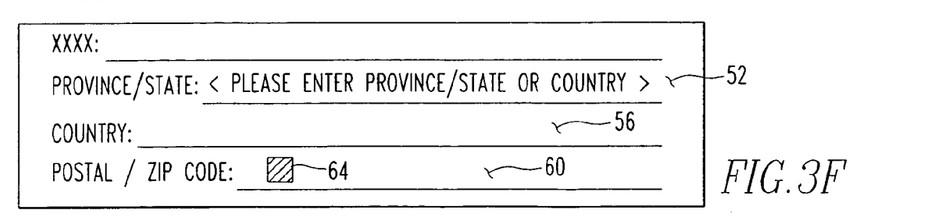

FIG. 3F depicts an additional feature of the handheld electronic device 4 and the improved method. Specifically, if the cursor 64 has been moved to the postal code data field 60 without a first input having been entered into either the sub-country data field 52 or the country data field 56, the display 8 depicts a prompt to the user such as "<Please Enter Province/State or Country>" or other such prompt. Such a prompt reminds the user to provide a first input that can be processed to obtain a first data element entered into either the sub-country data field 52 or the country data field 56 for the purpose of identifying a country, selecting a corresponding data format, and facilitating entry of data to fill the postal code data field 60. Upon providing the prompt, the user can either move the cursor 64 and provide sub-country or country data, in which event processing will proceed as depicted generally in FIGS. 3A–3E, or the user can ignore the prompt and begin to enter data in the postal code data field 60, in which case the handheld electronic device 4 will enter a manual mode in which keystrokes are not processed according to a selected corresponding data format.

Figure 2:
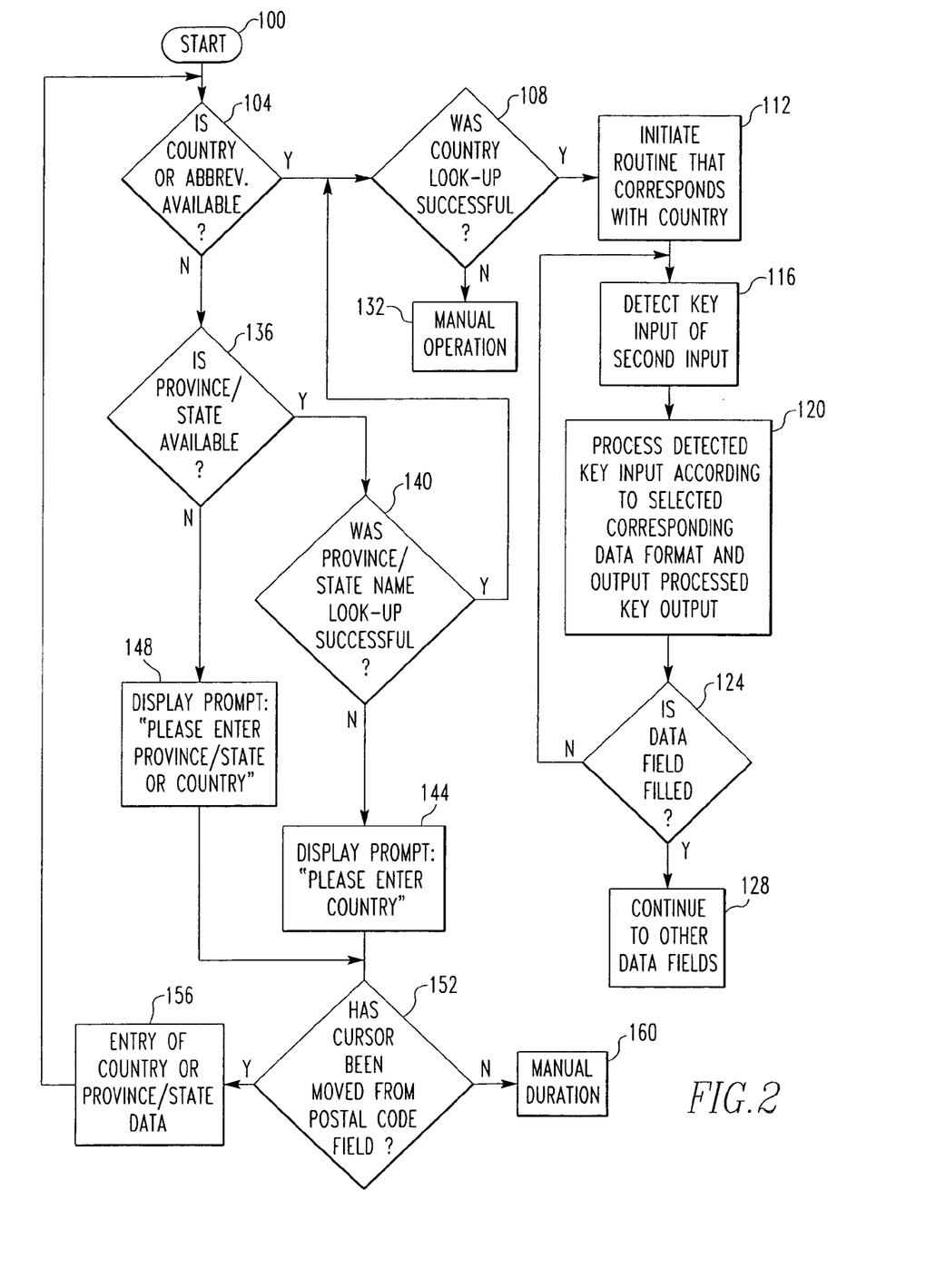
FIG. 2 is a flowchart of a routine of a processor of the handheld electronic device of FIG. 1.

A flowchart depicting a routine 48 performed by the processor 20 is provided generally in FIG. 2. The method begins at 100, and the processor 20 interrogates at 104 the portions of the memory 44 that correspond with the country data field 56 to determine whether a first input has been entered and processed to provide a first data element that has been entered into the country data field 56. If such first data element has been entered into the country data field 56, then the method at 108 performs a look-up function in which the country data is compared with a plurality of data records in the memory 44 to determine if the country data is valid, meaning that the country data matches one of the aforementioned data records. In this event, the matching data element is identified. The identified data record corresponds with a corresponding data format in the form of one of the routines 48. Upon identification of the identified data record, the particular corresponding data format is selected, and the particular routine 48 is initiated at 112.

Thereafter, upon detection at 116 by the processor 20 of keystrokes of a second input, the selected corresponding data format processes at 120 each keystroke according to the data format. For instance, if the selected corresponding data format is that which corresponds with a Canadian postal code, which follows the format ANA<SPACE>NAN, then the first character of the second data element is alphabetic. If the key 16 that is pressed is the key that includes both the letter R as the alphabetic character 28 and the digit 3 as the numeric character 32, according to the selected corresponding data format the processed key output will be a (capital) R.

After processing the key input to provide the processed key output, the processed key output is then output to the display 8 and to the portions of the memory 44 that correspond with the postal code data field 60. The processor 20 then interrogates at 124 the portions of the memory 44 that correspond with the postal code data field 60 to determine whether the postal code data field 60 has been filled with processed data. If not, then the processor 20 again is enabled to detect input keystrokes at 116. On the other hand, if it is determined that the postal code data field 60 has been filled, then the cursor 64 is moved to another field, as at 128, for possible further data entry.

If at step 108 the country look-up was unsuccessful, then the method initiates a manual data entry operation 132. During such manual operation 132, the processor 20 does not initiate or operate with a selected corresponding data format.

If at 104 the country data field 56 does not include a data entry, then the processor 20 examines the regions of the memory 44 that correspond with the sub-country data field 52 to determine whether a first input has been entered and processed to provide a first data element in the sub-country data field 52. If so, then a look-up operation occurs at 140 wherein the contents of the sub-country data field 52 are compared with a number of data records in the memory 44 to determine whether the contents of the sub-country data field 52 can be used to identify a country. In this regard, if any of such data records matches the contents of the sub-country data field 52, then the data records is identified and a country identifier that corresponds with the identified data records is also identified. The country identifier is then processed as at 108 to determine whether the country identifier can be successfully looked up to select a corresponding data format. If so, then the routine 48 corresponding with the selected corresponding data format is initiated and processing continues as at 112.

In the event that the cursor 64 has been manually moved to the postal code data field 60 and the contents of the sub-country data field 52 do not match any of the aforementioned data records, the processor 20 sends a signal to the display 8 to provide a prompt such as "<Enter Country Name or Abbreviation>" or similar prompt, as at 144. Similarly, if the cursor 64 has been manually moved to the postal code data field 60 and no state or province data has been entered into the sub-country data field 52, as at 136, then the processor 20 may provide a signal to the display 8 to display a different prompt, such as "Enter Country or Province/State Name or Abbreviation" or similar prompt, as at 148.

After the display either of the prompt at 144 or the prompt at 148, the processor 20 detects at 152 whether the cursor 64 has been moved out of the postal code data field 60 to a different data field. If it has, such as if the cursor is moved to one of the sub-country data field 52 and the country data field 56, then the user can enter data into such fields, as at 156, after which processing can continue as at 104. If, however, the processor detects that the cursor 64 has not been moved from the postal code data field 60 and the data is being entered into the postal code data field 60, then the processor will switch to a manual mode 160, which is similar to the manual mode 132.

A first example of the method of the invention is indicated generally in the following Table 1. In the indicated first example, the processor 20 has identified Canada as being the country of the address being entered, and the appropriate routine 48 for Canadian postal codes has been initiated. As mentioned above, the particular format of the Canadian postal code is ANA<SPACE>NAN. In the first example, the Canadian postal code that is desired to be entered is "R2L 3W8". Upon initiation of the appropriate routine 48, the keystrokes are as follows.

TABLE 1

| INPUT ORDER | KEY INPUT | FORMAT | OUTPUT |
|---|---|---|---|
| 1 | 3R | A | R |
| 2 | 2E | N | 2 |
| 3 | @L | A | L |
|  | (None) | <SPACE> | <SPACE> |
| 4 | 3R | N | 3 |
| 5 | 1W | A | W |
| 6 | 8X | N | 8 |

When the first key bearing the characters 24 "3R" is pressed, the selected corresponding data format processes such first key input to provide a first processed key output, which will be alphabetic, and which represents the letter "R". Next, upon pressing the key having the characters 24 "2E", the processor processes such second key input to provide a second processed key output, which will be numeric, and which represents the digit "2". Third, upon inputting the "@L" key, the processor outputs a third processed key output in alphabetic form and representative of the letter "L". Upon the fourth input of the key "3R", the routine 48 outputs a <SPACE> followed by the digit 3. If a user had actually entered a <SPACE>, the format 48 would still output only a single space. Processing continues in the same fashion for the fifth and sixth key inputs which result in fifth and sixth processed key outputs of the letter "W" and the digit "8", respectively. Once the processor 20 determines that the postal code data field 60 has been filled, the cursor 64 is moved to a different data field for further data entry.

A second example is provided in the accompanying Table 2, below. In the second example, an American zip code is being input. As mentioned above, an American zip code can either include five numeric characters, thus NNNNN, or can additionally include another four numeric characters separated with a hyphen from the preceding five numeric characters, thus NNNNN-NNNN. In this second example, the method of the invention has initiated at 112 the proper routine 48 that corresponds with an American zip code.

TABLE 2

| INPUT ORDER | KEY INPUT | FORMAT | OUTPUT |
|---|---|---|---|
| 1 | 4S | N | 4 |
| 2 | 5D | N | 5 |
| 3 | 2E | N | 2 |
| 4 | 6F | N | 6 |
| 5 | 3R | N | 3 |
|  | (Nothing) | - (Hyphen) | - (Hyphen) |
| 6 | 2E | N | 2 |
| 7 | 9C | N | 9 |
| 8 | 7Z | N | 7 |
| 9 | 8X | N | 8 |

If the first key input is a pressing of the key 16 having the alphabetic character 28 of "S" and the numeric character 32 of "4", then the processed key output that corresponds with such key input is "4". Processing continues for entry of the second through the fifth key inputs which are sequentially processed by the processor 20, and particularly the selected corresponding data format, to provide the four additional processed key outputs to provide the exemplary second data element "45263".

Upon the output of such five digits, the cursor 64 remains in the postal code data field 60 since the postal code data field 60 has not been filled with the maximum nine digits. However, the cursor 64 can be manually moved away from the postal code data field 60, which would complete entry of the American zip code in five-character form and would then enable the user to enter data into other data fields.

On the other hand, if after providing the five processed key outputs, the user continues to provide key inputs, such as the sixth key input "2E", then the selected corresponding data format will provide a processed key output which is in the form of a hyphen (-) followed by the digit "2". Even if the user had manually entered a hyphen, the processor still outputs only a single hyphen. Upon entry of seventh, eighth, and ninth key inputs, which sequentially result in seventh, eighth, and ninth numeric processed key outputs, respectively, the processor 20 detects that the postal code data field 60 has been filled and the cursor 64 is moved to a different data field.

It thus can be appreciated that the handheld electronic device 4 and the method of the invention facilitate data entry by providing a selected corresponding data format and by processing key inputs in such a fashion to provide processed key outputs that conform to the selected corresponding data format. For instance, in the context of the first example of Table 1, in the absence of the selected corresponding data format, a user, in order to enter the first character (capital) "R", would need to press the "3R" key 16 in combination with the <SHIFT> key 40. The next input of the digit "2" would require a user to press the "2E" key 16 in combination with the <ALT> key 36. All six of the characters in a Canadian postal code would require the pressing of one of the keys 16 in combination with the <ALT> key 36 or the <SHIFT> key 40, and the <SPACE> would also need to be entered by manually pressing an appropriate key. By employing the method of the invention, which selects the corresponding data format, the Canadian postal code can be entered with fewer than half of the keystrokes that would be otherwise required in the absence of the selected corresponding data format. Similar benefits can be achieved for nearly every other type of postal code, zip code, or other sub-country code.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of enabling data entry into a handheld electronic device, said data entry including a plurality of data elements, said method comprising:
   receiving a first data input into a first data field on said handheld electronic device;
   processing said first data input to obtain a first of said data elements;
   responsive to said first of said data elements, automatically selecting a corresponding data format from a plurality of pre-existing data formats for use with a second data input into a second data field;
   a receiving said second data input into said second data field on said handheld electronic device; and
   processing said second data input according to said selected corresponding data format to obtain a second of said data elements, said second of said data elements conforming to said selected corresponding data format.

2. The method of claim 1 further comprising obtaining said second of said data elements including at least a first character, said at least a first character being one of numeric and alphabetic according to said selected corresponding data format.

3. The method of claim 1 further comprising obtaining said second of said data elements including a plurality of characters, each one of said characters being one of numeric and alphabetic according to said selected corresponding data format.

4. The method of claim 1 further comprising comparing said first data input with a data set including a plurality of data records in a memory.

5. The method of claim 4 further comprising identifying one of said data records to obtain said first of said data elements.

6. The method of claim 4 further comprising initiating a routine to process said second data input according to said selected corresponding data format.

7. The method of claim 1 further comprising detecting a number of key inputs and processing each one of said detected key inputs to obtain a number of processed key outputs conforming to said selected corresponding data format.

8. The method of claim 7 further comprising outputting each one of said processed key outputs to correspond with a corresponding one of said detected key inputs.

9. The method of claim 8 further comprising outputting at least one of said processed key outputs that otherwise in the absence of said selected corresponding data format could be obtained from said corresponding one of said detected key inputs in combination with another detected key input.

10. The method of claim 8 further comprising outputting at least one of said processed key outputs that otherwise in the absence of said selected corresponding data format could represent a character that is one of alphabetic and numeric and that could represent a character that is the other of said one of alphabetic and numeric when said corresponding one of said detected key inputs is combined with one of a detected <ALT> key input and a detected <SHIFT> key input.

11. The method of claim 10 further comprising outputting said at least one of said processed key outputs to represent a character that is the other of said one of alphabetic and numeric.

12. The method of claim 8 further comprising outputting as a numeric character at least one of said processed key outputs that otherwise in the absence of said selected corresponding data format could represent a character that is alphabetic and that could represent a character that is numeric when said corresponding one of said detected key inputs is combined with one of a detected <ALT> key input and a detected <SHIFT> key input employing another one of said processed key outputs that corresponds with another corresponding one of said detected key inputs; and outputting as an alphabetic character said another one of said processed key outputs that otherwise in the absence of said selected corresponding data format could represent a character that is alphabetic and that could represent a character that is numeric when said another corresponding one of said detected key inputs is combined with one of a detected <ALT> key input and a detected <SHIFT> key input.

13. The method of claim 1 further comprising detecting initiation of said second data input; determining that said first data input has not yet been detected; and displaying a prompt to enter said first data input.

14. The method of claim 1 further comprising employing as said first data input one of a country input and a sub-country input.

15. The method of claim 14 further comprising determining that said first data input is said sub-country input; comparing said first data input with a data set that includes a plurality of country data records in a memory; and identifying one of said country data records to obtain said first of said data elements.

16. The method of claim 15 further comprising detecting as said sub-country input one of a Canadian province and an American state; and obtaining as said first of said data elements one of a representation of Canada and a representation of America, respectively.

17. The method of claim 16 further comprising selecting a first corresponding data format that corresponds with a Canadian postal code if said representation of Canada is obtained as said first of said data elements; and selecting a second corresponding data format that corresponds with an American zip code if said representation of America is obtained as said first of said data elements.

18. A handheld electronic device structured to enable data entry, said data entry including a plurality of data elements, said handheld electronic device comprising:
   a keyboard including a plurality of keys;
   a display;
   a processor including a memory and a routine that is adapted to respond to input signals from said keys and to generate output signals to said display;
   said routine being adapted to receive a first data input into a first data field and to process said first data input to obtain a first of said data elements;
   responsive to said first of said data elements, said routine being adapted to generate a first of said output signals to said display;
   responsive to said first of said data elements, said routine being adapted to select from said memory a corresponding data format from a plurality of pre-existing data formats for use with a second data input into a second data field;
   said routine being adapted to receive said second data input from said keys into said second data field; and
   responsive to said second data input, said routine being adapted to process said second data input according to said selected corresponding data format to obtain a second of said data elements and to generate a second of said output signals to said display.

19. The handheld electronic device of claim 18 wherein said routine is further adapted to generate said second of said output signals to represent a plurality of characters, each one of said characters being one of numeric and alphabetic according to said selected corresponding data format.

20. The handheld electronic device of claim 18 wherein said routine is further adapted to compare said first data input with a data set including a plurality of data records in said memory and to identify one of said data records to obtain said first of said data elements.

21. The handheld electronic device of claim 18 wherein said routine is further adapted to detect a number of key inputs, to process each one of said detected key inputs to obtain a number of processed key outputs that conform to said selected corresponding data format, and to output each one of said processed key outputs to correspond with a corresponding one of said detected key inputs.

22. The handheld electronic device of claim 21 wherein said routine is further adapted to output at least one of said processed key outputs that otherwise in the absence of said selected corresponding data format could be obtained from said corresponding one of said detected key inputs and another detected key input.

23. The handheld electronic device of claim 22 wherein said corresponding one of said detected key inputs represents a character that is one of alphabetic and numeric; wherein said corresponding one of said detected key inputs in combination with one of a detected <ALT> key input and a detected <SHIFT> key input represents a character that is the other of said one of alphabetic and numeric; and wherein said routine is further adapted to output said at least one of said processed key outputs to represent said character that is the other of said one of alphabetic and numeric.

24. The handheld electronic device of claim 18 wherein said routine is further adapted to detect initiation of said second data input, to determine that said first data input has not yet been detected, and to display a prompt to enter said first data input.

25. The handheld electronic device of claim 18 wherein said routine is further adapted to employ as said first data input one of a country input and a sub-country input.

26. The handheld electronic device of claim 18 wherein said routine is further adapted to determine that said first data input is said sub-country input, to compare said first data input with a data set that includes a plurality of country data records in said memory, and to identify one of said country data elements to said first of said data elements.

* * * * *